US012134920B2

(12) United States Patent
Cheng

(10) Patent No.: US 12,134,920 B2
(45) Date of Patent: Nov. 5, 2024

(54) HANDCUFF RING WITH MECHANISM FOR ENHANCED LOCKING AND HANDCUFFS HAVING THE SAME

(71) Applicant: KANTAS PRODUCTS CO., LTD., Taipei (TW)

(72) Inventor: Yang-Fu Cheng, Taipei (TW)

(73) Assignee: KANTAS PRODUCTS CO., LTD., Taipei (TW)

( * ) Notice: Subject to any disclaimer, the term of this patent is extended or adjusted under 35 U.S.C. 154(b) by 288 days.

(21) Appl. No.: 17/740,360

(22) Filed: May 10, 2022

(65) Prior Publication Data

US 2023/0142788 A1 May 11, 2023

(30) Foreign Application Priority Data

Nov. 9, 2021 (TW) ................................ 110141705

(51) Int. Cl.
*E05B 75/00* (2006.01)

(52) U.S. Cl.
CPC .................................... *E05B 75/00* (2013.01)

(58) Field of Classification Search
CPC ....................................................... E05B 75/00
See application file for complete search history.

(56) References Cited

U.S. PATENT DOCUMENTS 1,872,857 A * 8/1932 Wesson .................. E05B 75/00 70/16
2,390,885 A * 12/1945 Kelley .................... E05B 75/00 70/16
5,660,064 A * 8/1997 Ecker ...................... E05B 75/00 70/14
7,424,811 B2 * 9/2008 Ham ....................... E05B 75/00 70/16
8,210,006 B2 * 7/2012 Huang .................... E05B 75/00 70/16
9,551,170 B1 * 1/2017 Kovac ..................... E05B 75/00
10,920,459 B2 * 2/2021 Malone ................... E05B 75/00
2007/0163308 A1 * 7/2007 Piane ...................... E05B 75/00 70/16
2013/0192314 A1 * 8/2013 Cheng ..................... E05B 75/00 70/16
2020/0131807 A1 4/2020 Heiney

FOREIGN PATENT DOCUMENTS

TW M474789 U 3/2014
TW M553354 U 12/2017

* cited by examiner

*Primary Examiner* — Christopher J Boswell
(74) *Attorney, Agent, or Firm* — CIPO IP Group

(57) ABSTRACT

A handcuff ring with mechanism for enhanced locking includes a stationary strand and a movable strand. The stationary strand is provided therein with an engaging element, a stop portion, and an elastic element that is located between, and can push respectively, the engaging element and the stop portion. At least one locking groove is formed on the front side and/or the rear side of the stationary strand, and a thin rod, when being inserted from outside into the locking groove, can press an end of the stop portion to displace the stop portion toward a keyhole, so that the abutting portions of the stop portion and the engaging element abut against each other. Accordingly, through the locking groove(s) located on the front side and/or the rear side of the handcuff ring, a user can conveniently push the stop portion by the thin rod to finish the enhanced locking process.

12 Claims, 10 Drawing Sheets

HANDCUFF RING WITH MECHANISM FOR ENHANCED LOCKING AND HANDCUFFS HAVING THE SAME

CROSS-REFERENCE TO RELATED PATENT APPLICATION

This non-provisional application claims priority to and the benefit of, under 35 U.S.C. § 119(a). Taiwan Patent Application No. 110141705, filed Nov. 9, 2021 in Taiwan. The entire content of the above identified application is incorporated herein by reference.

FIELD

The present disclosure is related to a handcuff ring of a handcuff, and more particularly related to a handcuff ring formed with at least one locking groove on the front side and/or the rear side thereof.

BACKGROUND

Handcuffs are devices for restraining a person's wrists, are typically made of metal, and are generally used by a military person or police officer. A military person or police officer attempting to arrest or detain a suspect (or criminal) may use a pair of handcuffs as a tool for restricting the suspect's movement so that the handcuffed suspect cannot move freely and is thus kept from escaping control. Please refer to FIG. 1 for a common pair of handcuffs 1 that includes two handcuff rings 10 linked together by a chain 11. Each handcuff ring 10 is composed essentially of a stationary strand 100 and a movable strand 101. The movable strand 101 is pivotally connected at one end to the stationary strand 100 and can be rotated about the pivotal joint. The stationary strand 100 is provided therein with a locking mechanism and is formed with a keyhole 102. The keyhole 102 corresponds to the locking mechanism in the stationary strand 100. The movable strand 101 is provided with a plurality of teeth 103. The locking mechanism in the stationary strand 100 can engage with the teeth 103 of the movable strand 101 so that the movable strand 101 cannot separate from the stationary strand 100 freely.

Referring to FIG. 2, the stationary strand 100 is provided therein with a receiving space 104 for receiving the locking mechanism. The locking mechanism essentially includes an engaging element 12 and an elastic plate 13. The engaging element 12 is pivotally provided in the receiving space 104, and the bottom side of the engaging element 12 is protrudingly provided with a plurality of engaging teeth 120. The elastic plate 13 is located in the receiving space 104 and can push the engaging element 12 elastically such that the engaging element 12 tends to rotate downward about its pivotal joint. This structural feature allows the engaging teeth 120 on the engaging element 12 to engage with the teeth 130 of, and thereby restrict, the movable strand 101 so that the movable strand 101 cannot separate from the stationary strand 100 freely. Therefore, by closing the movable strand 101 and the stationary strand 100 with respect to each other and making the engaging teeth 120 engage with the teeth 103 of the movable strand 101, the handcuff ring can be closed around a suspect's wrist to restrict the suspect's movement effectively.

Moreover, referring to FIG. 2 in conjunction with FIG. 1, the right end of the engaging element 12 is protrudingly provided with a pushing portion 121, and the pushing portion 121 corresponds to the keyhole 102. When a user (e.g., a military person or police officer) inserts a key 2 into the keyhole 102 and turns the key 2, the key tooth 20 on the key 2 pushes the pushing portion 121 upward. Now that the engaging element 12 is pivotally provided in the receiving space 104, the key tooth 20 rotates, and causes upward displacement of, the engaging element 12 against the elastic force of the elastic plate 13 and thereby compresses the elastic plate 13 while pushing the pushing portion 121 upward, and the engaging teeth 120 of the engaging element 12 are separated from the teeth 103 of the movable strand 101 as a result. The user can then rotate the movable strand 101 to open the handcuff ring 10. Once the user draws the key 2 out of the keyhole 102, the elastic plate 1 pushes the engaging element 12 downward again, in order for the engaging element 12 to engage with the movable strand 101 next time.

To enhance the security of the handcuffs 1, with continued reference to FIG. 2 in conjunction with FIG. 1, the stationary strand 100 is further provided therein with a stop portion 14. The stop portion 14 can be displaced in the left-right direction, with the elastic plate 13 pressing against the stop portion 14. The right end of the stop portion 14 is provided with a first abutting portion 141 that extends downward, and the engaging element 12 is provided with a second abutting portion 122 that is adjacent to the right end of the engaging element 12 and extends upward. When the right end of the stop portion 14 abuts against the inner wall of the stationary strand 100, the first abutting portion 141 and the second abutting portion 122 abut against each other to prevent the engaging element 12 from being pushed upward; consequently, the difficulty of opening the handcuffs 1 by an illegitimate means (e.g., by inserting a pointed object such as a metal hairpin or nail into the keyhole 102) is increased. To enable pushing of the stop portion 14, the left side of the stationary strand 100 is formed with a through hole 15. The through hole 15 communicates with the receiving space 104 and corresponds to the left end of the stop portion 14 so that a military person or police officer can insert the thin rod 21 at an end of the key 2 into the through hole 15 to push the stop portion 14.

In terms of practical use, however, the limited thickness of each handcuff 1 limits the area in which the through hole 15 can be provided, so a military person or police officer must look at the through hole 15 attentively in order to insert the thin rod 21 into the through hole 15, which causes inconvenience of use. Moreover, as the through hole 15 is located in a lateral side of the stationary strand 100, it is often necessary for a military person or police officer to turn a handcuffed person's wrist in order to insert the thin rod 21 into the through hole 15, which also causes inconvenience of use. Accordingly, the present disclosure aims to effectively address issues including those referred to supra.

SUMMARY

In view of the above-referenced issues of the conventional handcuffs, as a result of longtime research and experiment, the present disclosure provides a handcuff ring with mechanism for enhanced locking and handcuffs having the same so as to resolve these conventional issues, to provide users better user experience, and to facilitate an enhanced locking process.

One aspect of the present disclosure is directed to a handcuff ring with mechanism for enhanced locking for a handcuff. The handcuff ring includes a stationary strand, a movable strand, an engaging element, an elastic element and a stop portion. The stationary strand is formed with an opening on an inner side thereof, a receiving space therein that extends from the opening, a keyhole on a front side thereof, and at least one locking groove on at least one of the front side and the rear side. The opening and the keyhole communicate with the receiving space separately, and the locking groove communicates with the receiving space. The movable strand has one end pivotally connected to the stationary strand, and an outer periphery of the other end thereof formed with a plurality of teeth, and can be rotated toward the opening to correspond the teeth to the opening. The engaging element is pivotally disposed in the receiving space with a top side thereof protrudingly formed with a first abutting portion, a bottom side thereof formed with a plurality of engaging teeth, and an end thereof that is adjacent to the keyhole protrudingly formed with a pushing portion. The elastic element is fixed in the receiving space, and can press against the engaging element through a bottom side of the elastic element, and drive the engaging element to engage the engaging teeth with the teeth when the other end of the movable strand is inserted into the opening so as to lock the movable strand in the opening and form a closed ring. The stop portion is movably positioned in the receiving space, has a first end corresponding to the locking groove, is formed with a second abutting portion that is adjacent to a second end of the stop portion and extending toward the engaging element, and can be displaced toward the keyhole until the second abutting portion is displaced to be located above, and abuts against, the first abutting portion when a thin rod is inserted into the locking groove to push the first end of the stop portion. The elastic element can press against a bottom side of the stop portion through the top side of the elastic element. Accordingly, through the locking groove(s) located on the front side and/or the rear side of the handcuff ring, a user can conveniently push the stop portion by the thin rod to finish the enhanced locking process.

In certain embodiments, the stationary strand is formed with an insertion allowing mechanism, the insertion allowing mechanism forms an insertion allowing space between the first end of the stop portion and an inner wall of the stationary strand, and the insertion allowing space corresponds to the locking groove and has a transverse length less than a transverse length of the locking groove, so that the first end of the stop portion is pushed by the thin rod when the thin rod is inserted through the locking groove.

In certain embodiments, the stationary strand includes a first plate, a second plate, and a stationary base located between the first and second plates and concavely formed therein with the receiving space, and an inner wall of the stationary base is formed with a protrusion that serves as the insertion allowing mechanism and can block the first end of the stop portion from lying against the inner wall of the stationary base so as to form the insertion allowing space.

In certain embodiments, the stationary strand includes a first plate, a second plate, and a stationary has located between the first and second plates and concavely finned therein with the receiving space, the first plate is formed with the locking groove, and a side of the second plate that corresponds to the locking groove is protrudingly formed with a block that extends outward and serves as the insertion allowing mechanism, and can block the first end of the stop portion from lying against the inner wall of the stationary base so as to form the insertion allowing space.

In certain embodiments, the stationary strand includes a plate element formed with a through space for communicating with the receiving space and accommodating the stop portion, and an inner wall of the plate element that is adjacent to the locking groove is concavely formed with an insertion allowing groove having a longitudinal width less than a longitudinal width of the first end of the stop portion and serving as the insertion allowing mechanism to block the first end of the stop portion from extending into the insertion allowing groove by being blocked by inner wall portions of the plate element that are adjacent to the insertion allowing groove and from lying against the inner wall of the stationary base so as to form the insertion allowing space.

In certain embodiments, the locking groove is formed on at least one of the first plate and the second plate.

Another aspect of the present disclosure is directed to a handcuff having at least two handcuff rings that are linked by a chain, and each of the handcuff rings is the above-referenced handcuff ring.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
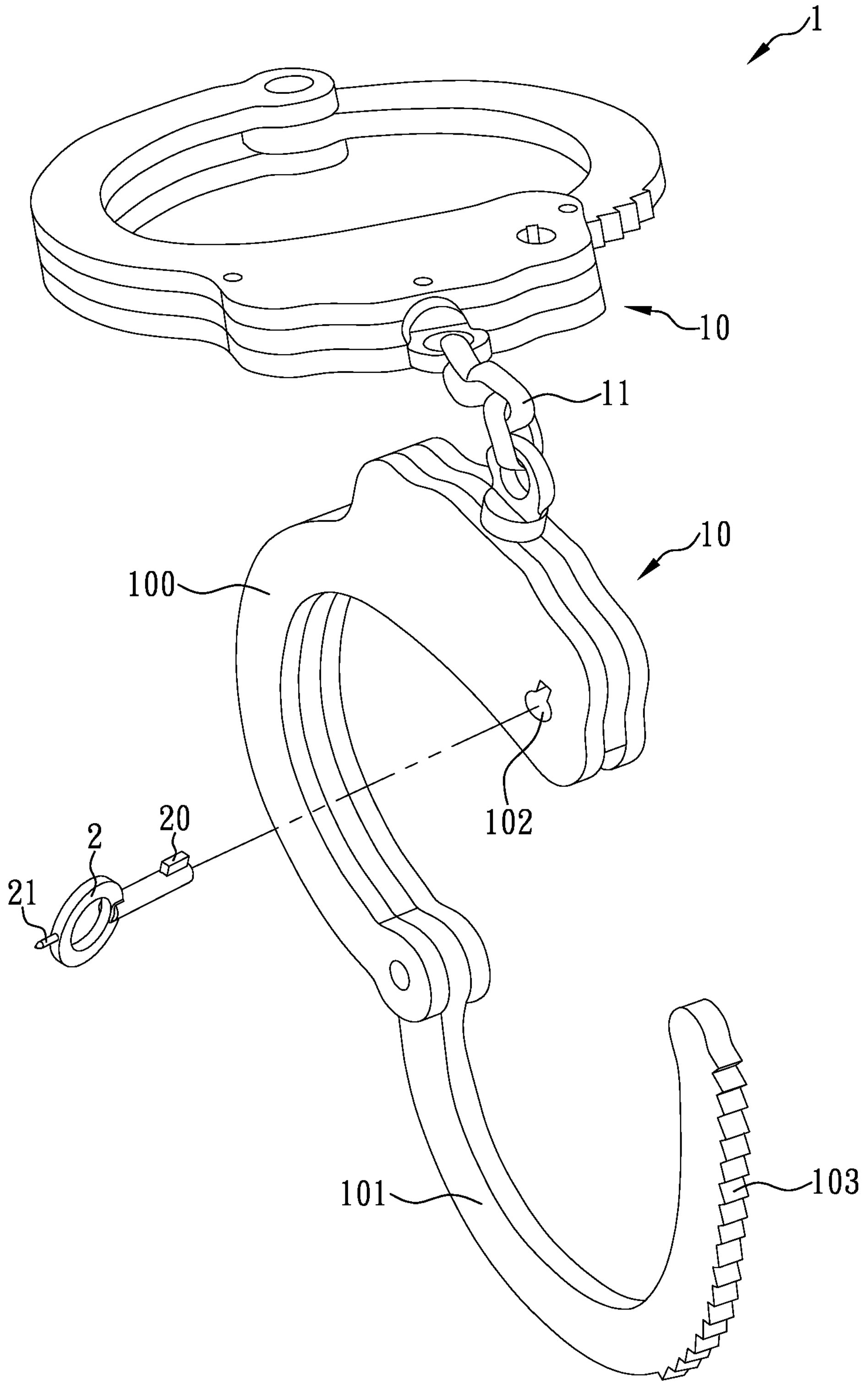
FIG. 1(Prior Art)
FIG. 1 is a schematic diagram of a conventional handcuff.
Figure 2:
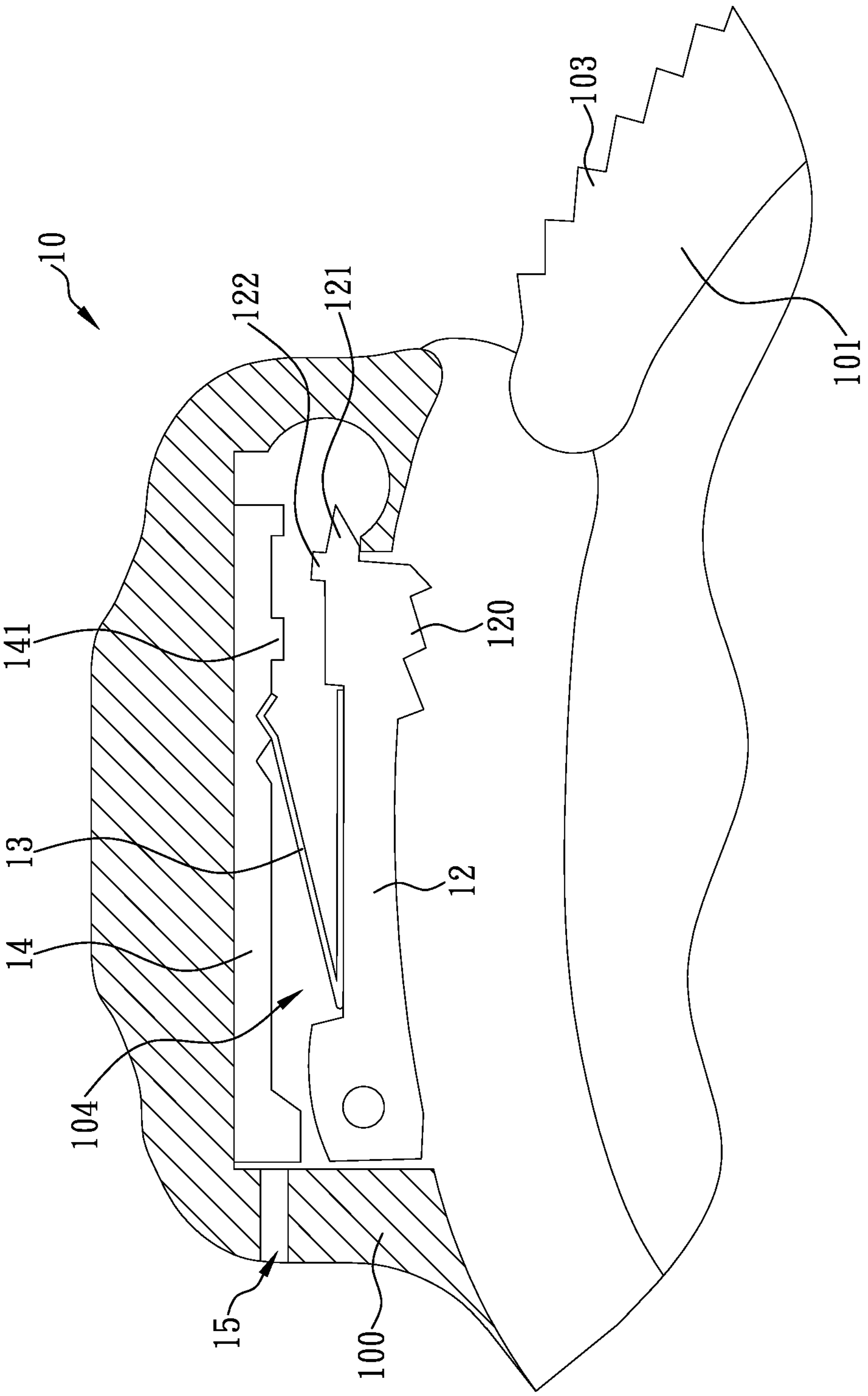
FIG. 2(Prior Art)
FIG. 2 is a cross-sectional view of a portion of the conventional handcuff.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, materials, objects or the like, which are for distinguishing one component/material/object from another one only, and are not intended to, nor should be construed to impose any substantive limitations on the components, materials, objects, or the like. Directional terms (e.g., “front”, “rear”, “left”, “right”, “upper/top” and/or “lower/bottom”) are explanatory only and are not intended to be restrictive of the scope of the present disclosure.

Figure 3:
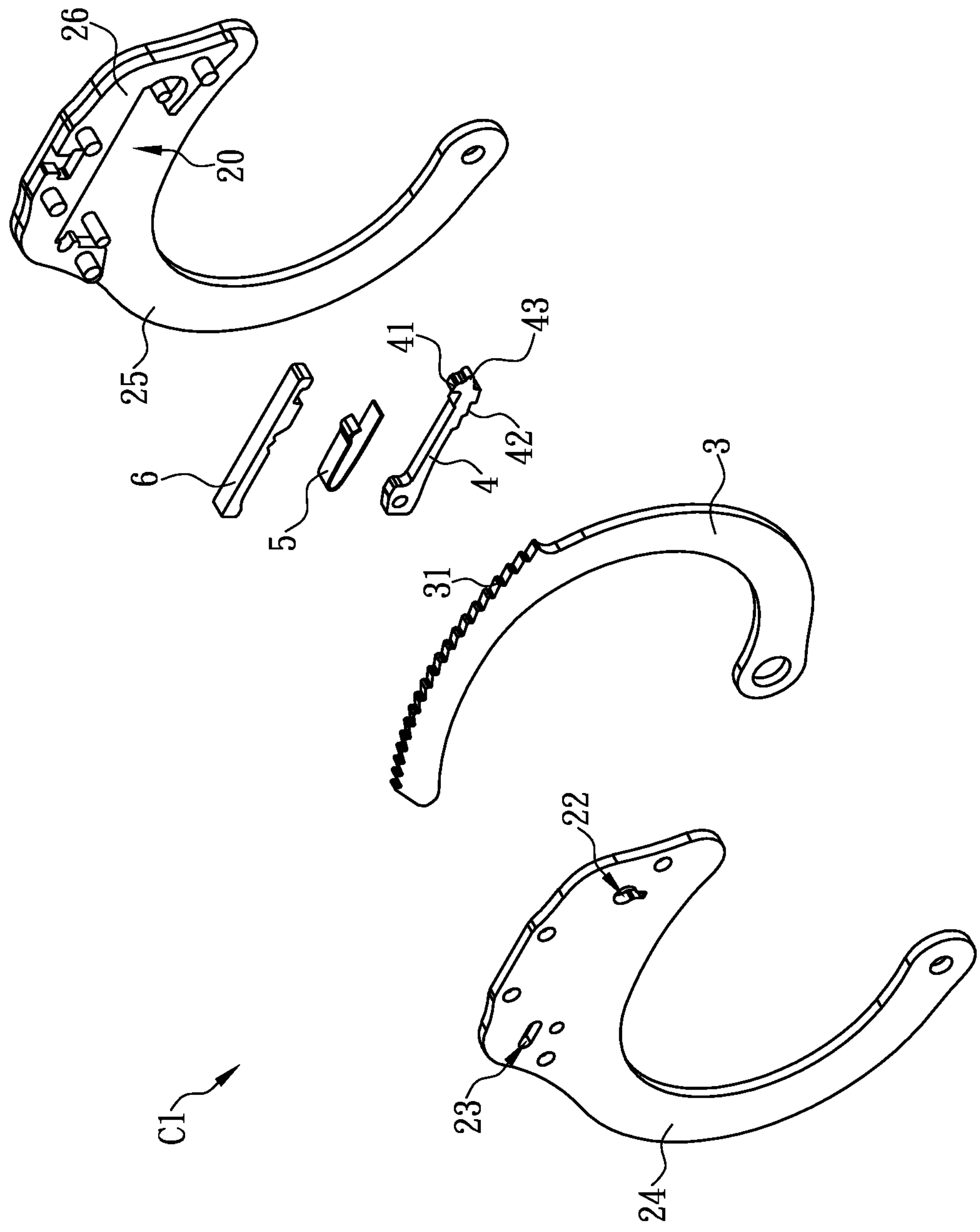
FIG. 3 is an exploded view of a handcuff ring according to certain embodiments of the present disclosure.
Figure 4:
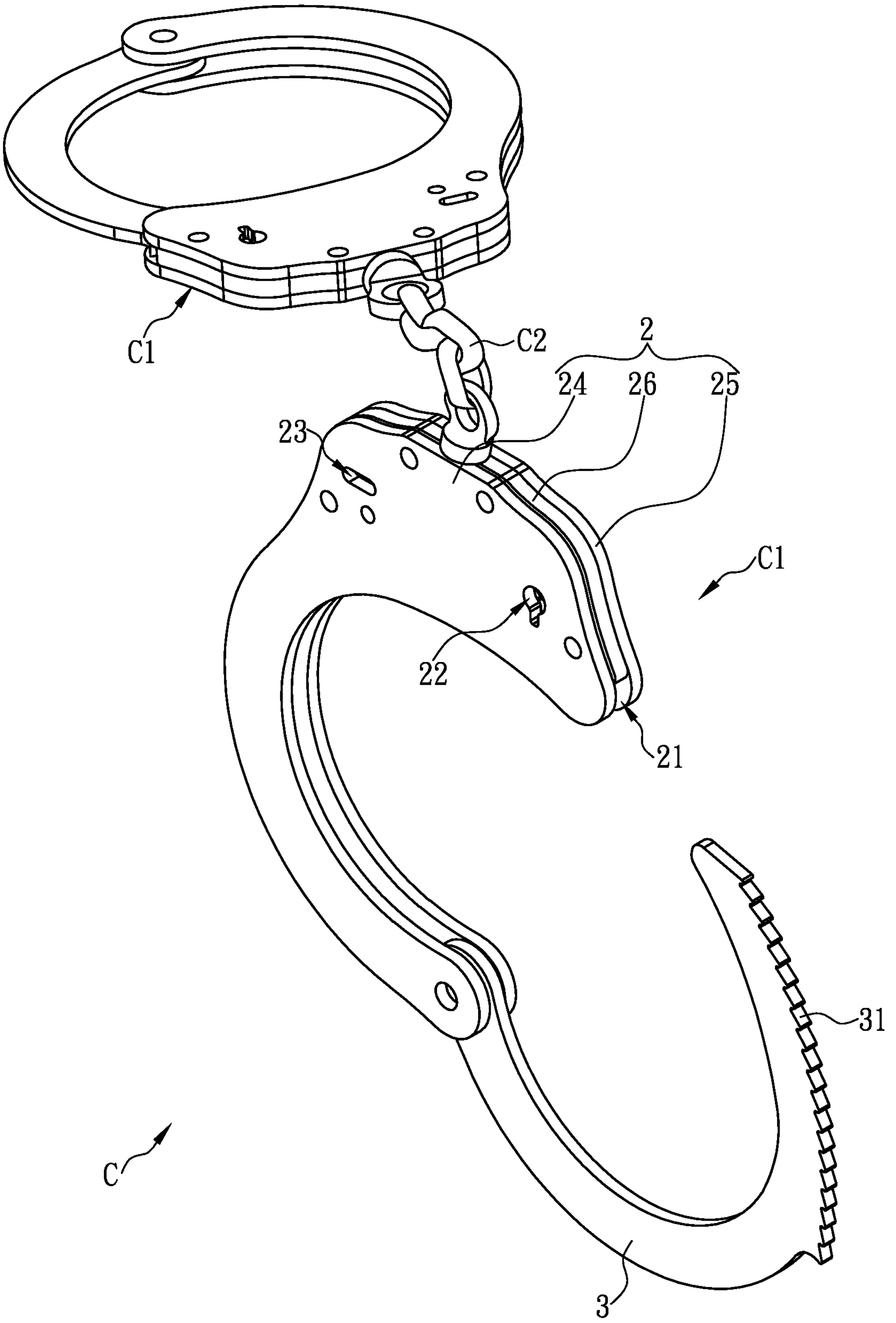
FIG. 4 is a perspective view of the handcuff ring according to certain embodiments of the present disclosure.

The present disclosure provides a handcuff ring having a mechanism for enhanced locking and handcuffs including the same. Referring to FIG. 3 and FIG. 4, a pair of handcuffs C includes two handcuff rings C1 and a chain C2 that links the handcuff rings C1 together. To facilitate description, the front side of a component is defined as the side facing the lower left corner of FIG. 3, the rear side as the side facing the upper right corner of FIG. 3, the left side as the side facing the upper left corner of FIG. 3, and the right side as the side facing the lower right corner of FIG. 3. In certain embodiments, with continued reference to FIG. 3 and FIG. 4, each handcuff ring C1 at least includes a stationary strand 2, a movable strand 3, an engaging element 4, an elastic element 5, and a stop portion 6. The inner side of the stationary strand 2 is formed with an opening 21, a receiving spacing extends from the opening into the stationary strand the front side of the stationary strand 2 is formed with a keyhole 22, the opening 21 and the keyhole 22 communicate with the receiving space 20 separately, and at least one locking groove 71 is formed on one or both of the front side and the rear side of the stationary strand 2 and is in communication with the receiving space 20.

In certain embodiments, referring to FIG. 3 in conjunction with FIG. 4, the stationary strand 2 can include a first plate 24, a second plate 25, and a stationary base 26. The first plate 24 can be formed with the keyhole 22 and the locking groove 23. The stationary base 26 can be located between the first plate 24 and the second plate 25 at a position adjacent to the top sides of the first and the second plates 24, 25. The bottom side of the stationary base 26 can be concavely formed with the receiving space 20, which extends upward into the stationary base 26, such that the opening 21 is formed at the bottom side of the stationary base 26. In certain embodiments, however, the structure of the stationary strand 2 can be adjusted according to product requirements. For example, the stationary base 26 can be integrally formed with the first plate 34 or the second plate 25. In certain embodiments, it is also feasible for the locking groove 23 to be formed only in the second plate 25 or in each of the first plate 24 and the second plate 25. When each of the front and rear sides of the stationary strand 2 is formed with a locking groove 23, the two locking grooves 23 correspond to each other in position.

Figure 5:
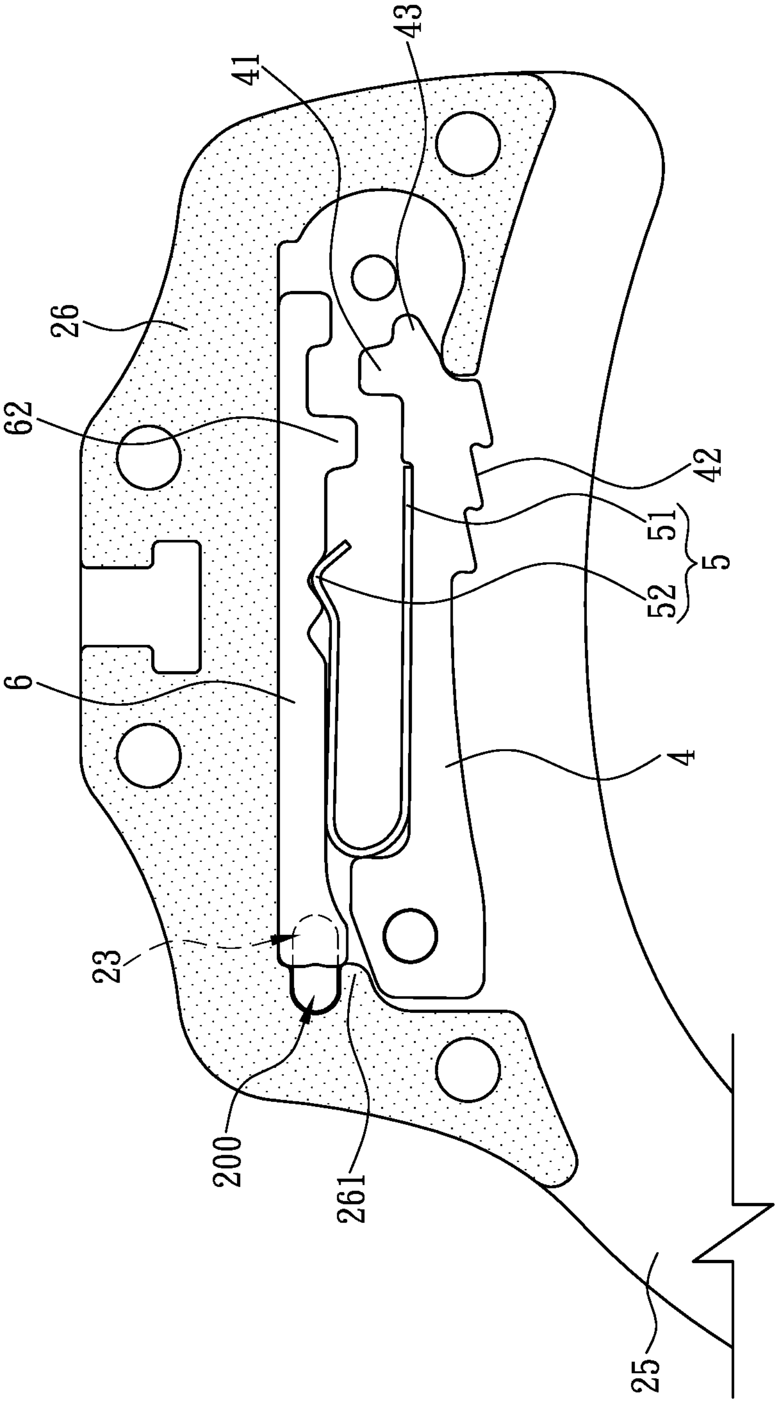
FIG. 5 is a cross-sectional view of a portion of the handcuff ring according to certain embodiments of the present disclosure, with a stop portion located at the left.

Referring to FIG. 3 in conjunction with FIG. 4 again, the movable strand 3 can have one end pivotally connected to the stationary strand 2, and the outer periphery of the other end of the movable strand 3 can be formed with a plurality of teeth 31. The movable strand 3 can be rotated toward the opening 21 in order tor the teeth 31 to correspond to the opening 21 and extend into the stationary strand 2. Referring to FIG. 5, the engaging element 4 can be pivotally disposed in the receiving space 20, with the top side of the engaging element 4 protrudingly formed with a first abutting portion 41, the bottom side of the engaging element 4 formed with a plurality of engaging teeth 42, and the end of the engaging element 4 that is adjacent to the keyhole 22 protrudingly formed with a pushing portion 43. The teeth 31 of the movable strand 3 match, and can engage with the engaging teeth 42. The pushing portion 43, which can be adjacent to the keyhole 22, can be pushed by a key in order to disengage the engaging teeth 42 from the teeth 31 and thereby bring the handcuff ring C1 into an unlocked state.

Referring to FIG. 5 in conjunction with FIG. 3, the elastic element 5 is fixed in the receiving space 20, and the bottom side of the elastic element 5 can press against the engaging element 4. In certain embodiments, the clastic element 5 can have been bent into a V or U shape such that the right side of the elastic element 5 branches into a lower pressing portion 51 and an upper pressing portion 52, and the lower pressing portion 51 can press against the engaging element 4. When the other end of the movable strand 3 is inserted into the opening 21, the engaging element 4 is driven by the elastic element 5 to have the engaging teeth 42 engage with the teeth 31 and thereby lock the movable strand 3 in the opening 21. The stationary strand 2 and the movable strand 3, therefore, are locked with respect to each other and form a closed ring.

Figure 6:
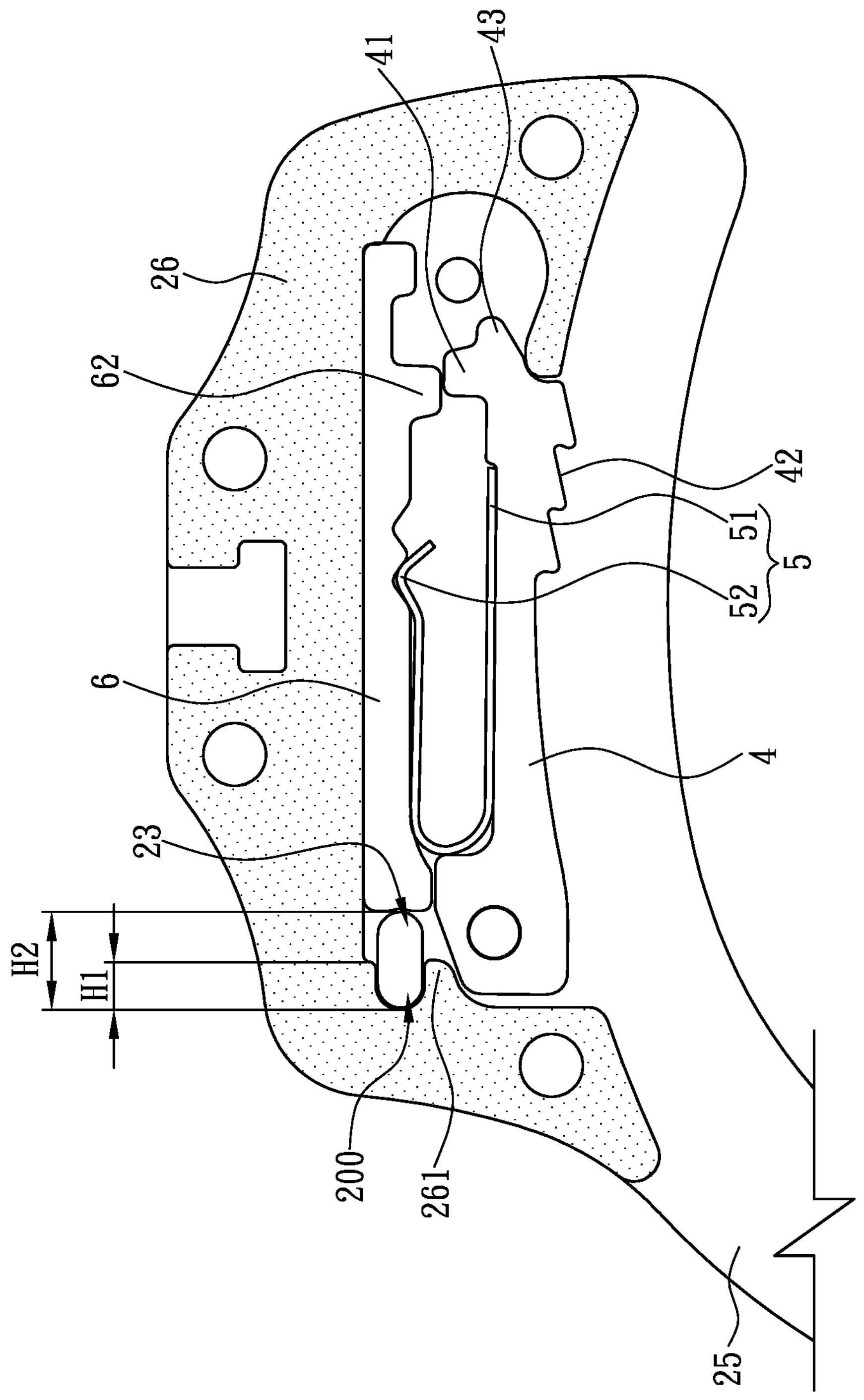
FIG. 6 is a cross-sectional view of the portion of the handcuff ring according to certain embodiments of the present disclosure, with the stop portion located at the right.

In certain embodiments, referring to FIG. 5 and FIG. 6, the stop portion 6 can be movably positioned in the receiving space 20, and the top side (i.e., the upper pressing portion 52) of the elastic element 5 can press against the bottom side of the stop portion 6 so that the stop portion 6 can stay lying against the top inner side of the stationary strand 2 while being displaced in the receiving space 20 in the left-right direction. A first end of the stop portion 6 can correspond to and lie exposed through the locking groove 23. The bottom side of the stop portion 6 is formed with a second abutting portion 62 adjacent to a second end of the stop portion 6 that is opposite to the first end, and the second abutting portion 62 can extend downward (i.e., toward the engaging element 4). In addition, the left inner wall of the stationary base 26 can be formed with a protrusion 261 for blocking the first end of the stop portion 6 from lying against the left inner wall of the stationary base 26 (see FIG. 5), and an insertion allowing space 200 is therefore formed between the first end of the stop portion 6 and the left inner wall of the stationary base 26. In other words, the protrusion 261 can serve as an insertion allowing mechanism for forming the required insertion allowing space 200.

It should be pointed out that, with continued reference to FIG. 5 and FIG. 6, the feature defined by the protrusion 261 is designed in relation to the insertion allowing space 200. A manufacturer, therefore, may either provide the inner wall of the stationary base 26 with the outwardly extending protrusion 261 or form the protrusion 261 by forming an inwardly extending insertion allowing space 200 on the inner wall of the stationary base 26, as long such a protrusion 261 formed can block the first end of the stop portion 6. Furthermore, the insertion allowing mechanism defined in the present disclosure refers, but is not limited, to a mechanism through which the insertion allowing space 200 can be formed between the first end of the stop portion 6 and the inner wall of the stationary strand 2 (in certain embodiments, the inner wall of the stationary base 26), and through which the insertion allowing space 200 can correspond to the locking groove 23. The insertion allowing space 200 can have a transverse length 111 less than the transverse length 112 of the locking groove 23 (see FIG. 6) so that a user can insert a thin rod through the locking groove 23 into the insertion allowing space 200 to push the first end of the stop portion 6 and thereby displace the stop portion 6 toward the keyhole 22 until the second abutting portion 62 is displaced to be located above, and abuts against, the first abutting portion 41 (see FIG. 6) to produce an enhanced locking effect. Accordingly, when an attempt is made to open the handcuff ring C1 by an illegitimate means (e.g., by inserting a pointed object such as a metal hairpin or nail into the keyhole 22 in order to push the pushing portion 43), it will be impossible to push the stop portion 6 away at the same time, so the handcuff ring C1 cannot be opened with ease.

When a handcuff user intends to open the handcuff ring C1, referring to FIG. 6 in conjunction with FIG. 3, the key can be inserted into the keyhole 22 and turned counterclockwise to begin with. The stop portion 6 will, as a result, be displaced leftward from the position in FIG. 6 to the position in FIG. 5 such that the second abutting portion 62 is moved away from the First abutting portion 41. The key can then be turned clockwise in order for the key tooth on the key to push the pushing portion 4 and thereby separate the engaging teeth 42 from the teeth 31, bringing the handcuff ring C1 into the unlocked state.

Figure 7:
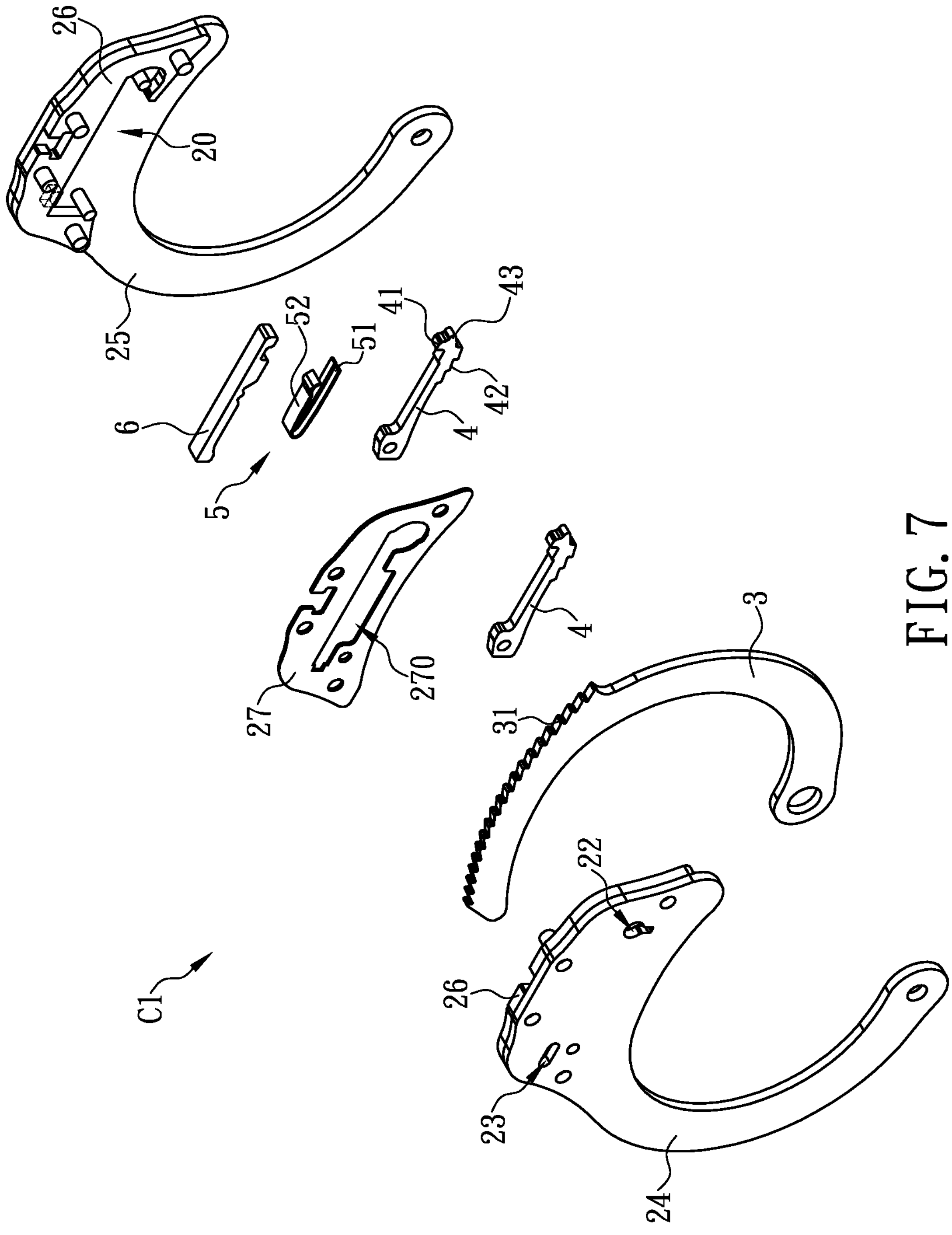
FIG. 7 is an exploded view of a handcuff ring according to certain embodiments of the present disclosure.

The insertion allowing mechanism according to the present disclosure is not limited to that described supra. In certain embodiments, each handcuff ring C1 has two stationary bases 26 and a plate element 27. Referring to FIG. 7, one of the stationary bases 26 can be fixed on the first plate 24, and the other stationary base 26 can be fixed on the second plate 25. The plate element 27 can be located between the two stationary bases 26 and is formed with a through space 270 that can be in communication with the receiving space 20. At least the stop portion 6 can be accommodated in the through space 270 and displaced in the through space 270 in the left-right direction. As the two stationary bases 26 increase the thickness of the handcuff ring C1, two engaging elements 4 can be provided in certain embodiments to lock together the stationary strand 2 and the movable strand 3 even more securely. The two engaging elements 4 can be located on two opposite sides of the plate element 27 respectively, and the lower pressing portion 51 of the elastic element 5 can be formed with a slit so as to form two branch portions that can press and abut against the two engaging elements 4 respectively. However, the present disclosure is not limited thereto.

Figure 8:
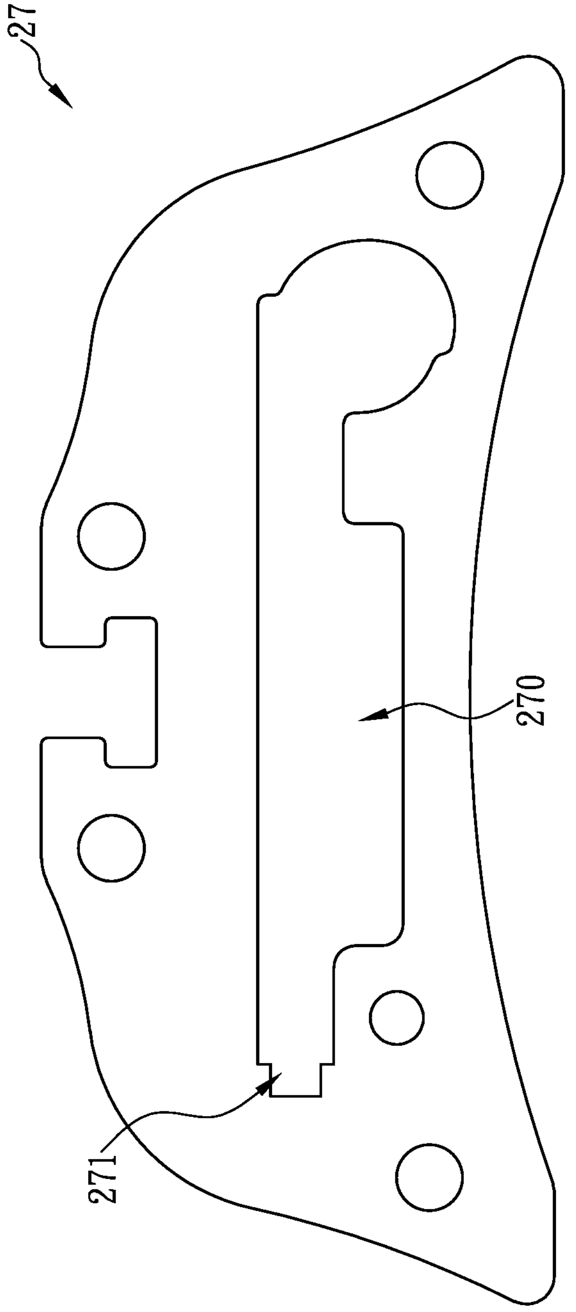
FIG. 8 is a schematic diagram of a plate element according to certain embodiments of the present disclosure.
Figure 9:
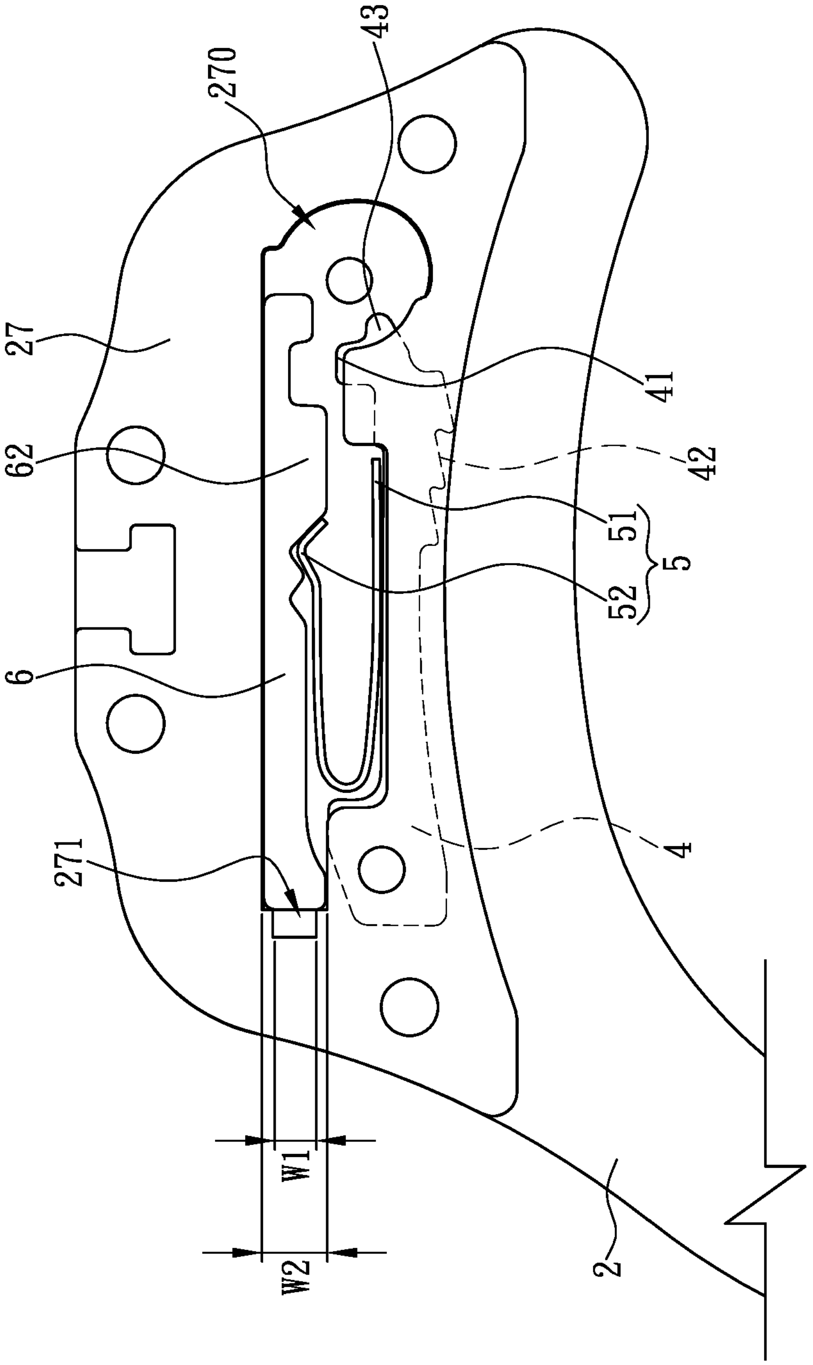
FIG. 9 is a cross-sectional view of a portion of a handcuff ring according to certain embodiments of the present disclosure.

Referring to FIG. 8 in conjunction with FIG. 7, the inner wall of the plate element 27 that is adjacent to the locking groove 23 (e.g., the left inner wall of the plate element 27 as shown in FIG. 8) is concavely formed with an insertion allowing groove 271. The groove bottom of the insertion allowing groove 271 (i.e., the leftmost wall of the insertion allowing groove 271 in FIG. 8) is flush with or adjacent to the inner walls of the stationary bases 26, and the longitudinal width W1 of the insertion allowing groove 271 is less than the longitudinal width W2 of the first end of the stop portion 6 (see FIG. 9). Accordingly, the structural feature defined by the insertion allowing groove 271, into which the first end of the stop portion 6 cannot extend, can serve as an insertion allowing mechanism; when the stop portion 6 is moved leftward, the first end of the stop portion 6 will be blocked from lying against the left inner walls of the stationary bases 26 the inner wall of the stationary strand 2) by the inner wall portions of the plate element 27 that are adjacent to the insertion allowing groove 271, such that the insertion allowing groove 271 forms an insertion allowing space that is alike the insertion allowing space 200 described supra. A user, therefore, can insert a thin rod through the locking groove 23 into the insertion allowing groove 271 to displace the stop portion 6 rightward by pushing the first end of the stop portion 6.

Figure 10:
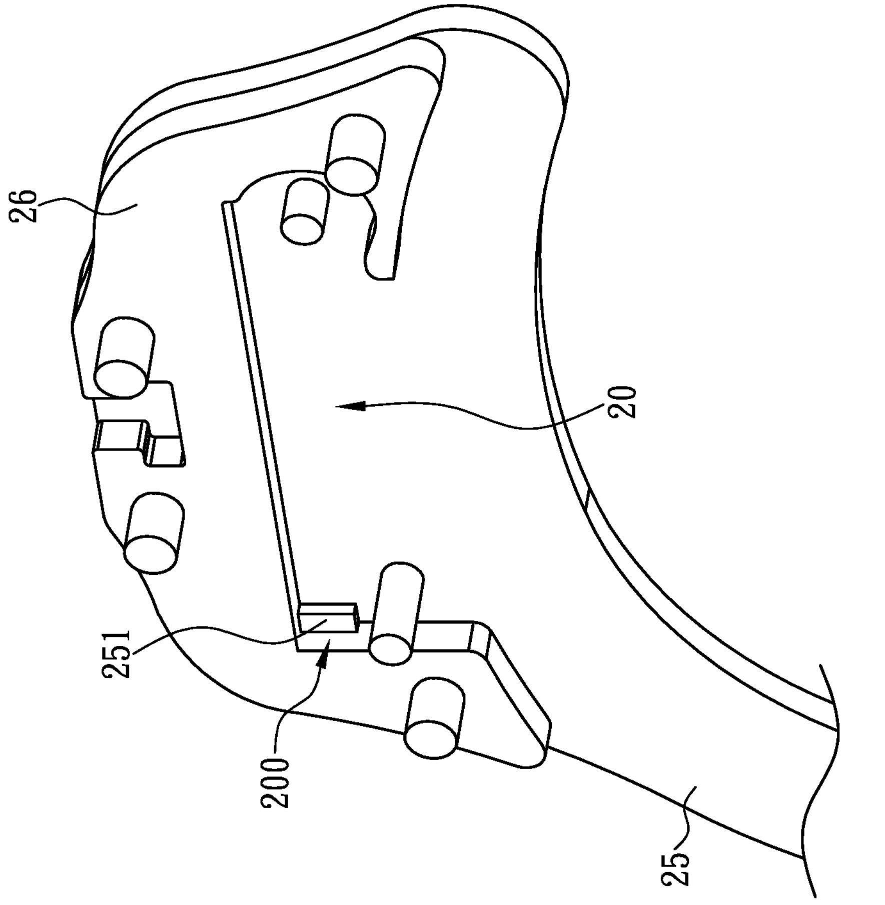
FIG. 10 is a cross-sectional view of a portion of a handcuff ring according to certain embodiments of the present disclosure.

In certain embodiments, referring to FIG. 10, the side of the second plate 25 that corresponds to the locking groove 23 (see FIG. 3) (e.g., the front side of the second plate 25) is protrudingly formed with a block 251 that extends outward to serve as the insertion allowing mechanism. The front side of the block 251 is spaced apart from the locking groove 23 by a distance in order to form the insertion allowing space 200. As the rear side of the stop portion 6 lies against the front side of the second plate 25, the first end of the stop portion 6 will be blocked by the block 251 from lying against the left inner wall of the stationary base 26 when the first end of the stop portion 6 is displaced leftward. When a user inserts a thin rod into the locking groove 23, therefore, the thin rod will be outside the front side of the block 251 (i.e., in the area of the insertion allowing space 200) and can displace the stop portion 6 rightward by pushing the first end of the stop portion 6.

Accordingly, it can be known from the above that by positioning the locking groove(s) 23 at the front side and/or the rear side of a handcuff ring C1, due to the relatively larger area(s) of the from side and/or the rear side of the handcuff ring C1, the size and position of the locking groove 23 can be arranged in a more flexible way, and its production is easier. For a military person or police officer, since the locking groove(s) 23 is located at the front side and/or the rear side of the handcuff ring C1, a thin rod can be easily and swiftly inserted into a locking groove 23 to push the stop portion 6, which greatly improves use convenience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A handcuff ring with mechanism for enhanced locking for a handcuff, the handcuff ring comprising:

a stationary strand formed with an opening on an inner side thereof, a receiving space therein that extends from the opening, a keyhole on a front side thereof, at least one locking groove on at least one of the front side and the rear side and sunken towards the receiving space along an axial direction, and an insertion allowing mechanism other than the at least one locking groove that protrudes towards the receiving space along a protruding direction or is sunken along a depressing direction away from the receiving space, wherein each of the protruding direction and the depressing direction of the insertion allowing mechanism is different from the axial direction of the at least one locking groove, and the opening and the keyhole communicate with the receiving space separately, and the locking groove communicates with the receiving space;

a movable strand having one end pivotally connected to the stationary strand and an outer periphery of the other end thereof formed with a plurality of teeth, and configured to be rotated toward the opening to correspond the teeth to the opening;

an engaging element pivotally disposed in the receiving space with a top side thereof protrudingly formed with a first abutting portion, a bottom side thereof formed with a plurality of engaging teeth, and an end thereof that is adjacent to the keyhole protrudingly formed with a pushing portion;

an elastic element fixed in the receiving space and configured to:

press against the engaging element through a bottom side of the elastic element; and drive the engaging element to engage the engaging teeth with the teeth when the other end of the movable strand is inserted into the opening so as to lock the movable strand in the opening and form a closed ring; and a stop portion movably positioned in the receiving space, having a first end corresponding to the locking groove, formed with a second abutting portion that is adjacent to a second end of the stop portion and extending toward the engaging element, and configured to be displaced toward the keyhole until the second abutting portion is displaced to be located above, and abuts against, the first abutting portion when a thin rod is inserted into the locking groove to push the first end of the stop portion, wherein the insertion allowing mechanism forms an insertion allowing space different from the at least one locking groove and whose boundary has a part facing and spaced apart from the first end of the stop portion, a transverse length of the insertion allowing space is less than a transverse length of the at least one locking groove, and the elastic element is configured to press against a bottom side of the stop portion through the top side of the elastic element.

2. The handcuff ring according to claim 1, wherein the insertion allowing mechanism forms the insertion allowing space between the first end of the stop portion and an inner wall of the stationary strand, and the insertion allowing space corresponds to the locking groove and has the transverse length less than the transverse length of the locking groove, so that the first end of the stop portion is pushed by the thin rod when the thin rod is inserted through the locking groove.

3. The handcuff ring according to claim 2, wherein the stationary strand comprises a first plate, a second plate, and a stationary base located between the first and second plates and concavely formed therein with the receiving space, and an inner wall of the stationary base is formed with a protrusion serving as the insertion allowing mechanism and configured to block the first end of the stop portion from lying against the inner wall of the stationary base so as to form the insertion allowing space.

4. The handcuff ring according to claim 3, wherein the locking groove is formed on at least one of the first plate and the second plate.

5. A handcuff, having at least two handcuff rings that are linked by a chain, wherein each of the handcuff rings is the handcuff ring according to claim 4.

6. A handcuff, having at least two handcuff rings that are linked by a chain, wherein each of the handcuff rings is the handcuff ring according to claim 3.

7. The handcuff ring according to claim 2, wherein the stationary strand comprises a first plate, a second plate, and a stationary base located between the first and second plates and concavely formed therein with the receiving space, the first plate is formed with the locking groove, and a side of the second plate that corresponds to the locking groove is protrudingly formed with a block that extends outward and serves as the insertion allowing mechanism, and is configured to block the first end of the stop portion from lying against the inner wall of the stationary base so as to form the insertion allowing space.

8. A handcuff, having at least two handcuff rings that are linked by a chain, wherein each of the handcuff rings is the handcuff ring according to claim 7.

9. The handcuff ring according to claim 2, wherein the stationary strand comprises a plate element formed with a through space for communicating with the receiving space and accommodating the stop portion, and an inner wall of the plate element that is adjacent to the locking groove is concavely formed with an insertion allowing groove having a longitudinal width less than a longitudinal width of the first end of the stop portion and serving as the insertion allowing mechanism to block the first end of the stop portion from extending into the insertion allowing groove by being blocked by inner wall portions of the plate element that are adjacent to the insertion allowing groove and from lying against the inner wall of the stationary base so as to form the insertion allowing space.

10. A handcuff, having at least two handcuff rings that are linked by a chain, wherein each of the handcuff rings is the handcuff ring according to claim 9.

11. A handcuff, having at least two handcuff rings that are linked by a chain, wherein each of the handcuff rings is the handcuff ring according to claim 2.

12. A handcuff, having at least two handcuff rings that are linked by a chain, wherein each of the handcuff rings is the handcuff ring according to claim 1.

* * * * *